(12) United States Patent
Kim

(10) Patent No.: US 11,962,161 B2
(45) Date of Patent: Apr. 16, 2024

(54) WIRELESS POWER RECEIVING DEVICE FOR ELECTRIC VEHICLE

(71) Applicant: AMOSENSE CO., LTD, Cheonan-si (KR)

(72) Inventor: Chol Han Kim, Cheonan-si (KR)

(73) Assignee: AMOSENSE CO., LTD, Cheonan-si (KR)

( * ) Notice: Subject to any disclaimer, the term of this patent is extended or adjusted under 35 U.S.C. 154(b) by 95 days.

(21) Appl. No.: 17/756,885

(22) PCT Filed: Nov. 12, 2020

(86) PCT No.: PCT/KR2020/015834
§ 371 (c)(1),
(2) Date: Jun. 3, 2022

(87) PCT Pub. No.: WO2021/112429
PCT Pub. Date: Jun. 10, 2021

(65) Prior Publication Data
US 2022/0416574 A1 Dec. 29, 2022

(30) Foreign Application Priority Data
Dec. 6, 2019 (KR) .......................... 10-2019-0161810

(51) Int. Cl.
*H02J 50/00* (2016.01)
*B60L 53/12* (2019.01)
(Continued)

(52) U.S. Cl.
CPC ............ *H02J 50/005* (2020.01); *B60L 53/12* (2019.02); *H01F 27/24* (2013.01); *H02J 50/10* (2016.02); *H02J 50/70* (2016.02)

(58) Field of Classification Search
CPC .......... H02J 50/005; H02J 50/10; H02J 50/70; B60L 53/12; H01F 27/24
See application file for complete search history.

(56) References Cited

U.S. PATENT DOCUMENTS 11,217,387 B2 * 1/2022 Ekbäck .................. H01F 38/14
2014/0327391 A1 11/2014 Niederhauser et al.
(Continued)

FOREIGN PATENT DOCUMENTS

| JP | 2018-82088 A | 5/2018 |
| KR | 10-2017-0143167 A | 12/2017 |

(Continued)

OTHER PUBLICATIONS

International Search Report for PCT/KR2020/015834 by Korean Intellectual Property Office dated Feb. 15, 2021.
(Continued)

*Primary Examiner* — Carlos Amaya
(74) *Attorney, Agent, or Firm* — BROADVIEW IP LAW, PC

(57) ABSTRACT

A wireless power receiving device for an electric vehicle is provided. A wireless power receiving device for an electric vehicle, according to an exemplary embodiment of the present invention, comprises: a wireless power receiving coil for receiving wireless power to be transmitted from the outside; a coil support member which has a position fixing means formed at a position corresponding to the wireless power receiving coil so as to fix the wireless power receiving coil, and which is made of a material including a magnetic substance so as to shield the magnetic field; a ferrite core including a plurality of ferrite block bodies which have predetermined areas and which are arranged on one surface of the coil support member so as to be adjacent to each other; and a plate-shaped metal plate for covering one surface of the ferrite core by having a predetermined area.

9 Claims, 7 Drawing Sheets

(51) Int. Cl.
*H01F 27/24* (2006.01)
*H02J 50/10* (2016.01)
*H02J 50/70* (2016.01)

(56) References Cited

U.S. PATENT DOCUMENTS

2015/0367739 A1* 12/2015 Böser .................. B60L 53/12
                                                                      320/108
2016/0341573 A1* 11/2016 Widmer ................ H02J 50/12
2018/0137970 A1*  5/2018 Doi ........................ H02J 50/10
2018/0158601 A1    6/2018 Kurs
2020/0381178 A1* 12/2020 Kweon ................. H02J 50/10

FOREIGN PATENT DOCUMENTS

| KR | 10-2018-0063768 A | 6/2018 |
| KR | 10-2018-0083773 A | 7/2018 |
| KR | 10-2019-0011112 A | 2/2019 |
| KR | 10-2019-0030371 A | 3/2019 |
| KR | 10-2019-0035068 A | 4/2019 |
| KR | 10-2019-0107893 A | 9/2019 |

OTHER PUBLICATIONS

Non-Final Office Action for KR 10-2019-0161810 by Korean Intellectual Property Office dated Aug. 30, 2022.

* cited by examiner

WIRELESS POWER RECEIVING DEVICE FOR ELECTRIC VEHICLE

CROSS-REFERENCE TO RELATED APPLICATIONS

This application is a National Phase Entry Application of PCT Application No. PCT/KR2020/015834 filed on Nov. 12, 2020, which claims priority to Korean Patent Application No. 10-2019-0161810 filed on Dec. 6, 2019 in Korean Intellectual Property Office, the entire contents of which is hereby incorporated by reference in its entirety.

TECHNICAL FIELD

The present invention relates to a wireless power transfer technology, and more specifically, to a wireless power receiving device for an electric vehicle.

BACKGROUND ART

Exhaust gases emitted from vehicles using petroleum is emerging as a major cause of environmental pollution. Accordingly, efforts are being made to reduce the exhaust gases of vehicles, and research and development of vehicles capable of reducing the exhaust gases are being conducted.

In this situation, the development of electric vehicles using alternative energy, such as natural gas and ethanol, and electric energy is emerging as a representative next-generation vehicle technology, but electric vehicles being currently developed have limitations in mileage, weight, price, required charging time, infrastructure construction, and the like.

In other words, the electric vehicles have a limited capacity of a battery that provides driving power, and thus have difficulty in traveling a long distance. Accordingly, various technologies are being developed to overcome the limitations in long-distance traveling of the electric vehicles being currently developed.

Meanwhile, wireless methods are applied to current electric vehicles to conveniently charge a battery.

For this wireless charging method, wireless power receiving devices mounted on the electric vehicles are configured in a form that includes a receiving coil configured to wirelessly receive power supplied from an external device according to the SAE J2954, which is an international standard, a ferrite core composed of a plurality of ferrite block bodies disposed on one surface of the receiving coil in order to shield a magnetic field generated from the coil, and a metal plate disposed on an upper portion of the ferrite core in order to prevent damage to or malfunction of other electronic parts, and the receiving coil is fixed through a separate tray.

However, a conventional tray for fixing the receiving coil has a limitation in increasing the efficiency of wireless power transmission because it simply serves to fix the receiving coil. Accordingly, the conventional wireless power receiving device has a limitation in that the efficiency of the wireless power transmission is 90% or less, and there is a problem in that heat is excessively generated due to the amount of loss of 10% or more.

DISCLOSURE

Technical Problem

The present invention has been devised in consideration of the above points and is directed to providing a wireless power receiving device for an electric vehicle, which can improve assemblability while increasing the efficiency of wireless power transfer.

Technical Solution

In order to solve the above problems, the present invention provides a wireless power receiving device for an electric vehicle including: a wireless power receiving coil configured to receive wireless power transmitted from the outside; a coil support member formed with a position fixing means at a position corresponding to the wireless power receiving coil to fix the wireless power receiving coil, and made of a material including a magnetic substance to shield a magnetic field; a ferrite core including a plurality of ferrite block bodies having predetermined areas and disposed on one surface of the coil support member to be adjacent to each other; and a plate-shaped metal plate having a predetermined area and covering one surface of the ferrite core.

In addition, the coil support member may be a composite in which the magnetic substance is dispersed in a polymer.

For example, the position fixing means may be an accommodating groove formed by recessing the one surface of the coil support member.

As another example, the position fixing means may be a pair of protrusions formed to protrude from the one surface of the coil support member at an interval so that a conductive member configuring the wireless power receiving coil may be fitted therein.

In addition, the magnetic substance may include at least one type of an amorphous alloy, a nano-crystalline alloy, a ferrite, silicon steel, and permalloy.

In addition, the wireless power receiving device for an electric vehicle may further include a housing-shaped case having an inner space with an open one side to accommodate the wireless power receiving coil, the coil support member, and the ferrite core, the case may include a bottom portion having a predetermined area, and a sidewall portion protruding from an edge of the bottom portion to a predetermined height to form the inner space, and an edge of the metal plate may be coupled to the sidewall portion via a fastening member to cover the open one side of the inner space.

In addition, the case may be made of a plastic material having a heat dissipation property.

In addition, the wireless power receiving device for an electric vehicle may further include a plate-shaped shielding sheet disposed between the ferrite core and the metal plate. In this case, a boundary region between two ferrite block bodies disposed adjacent to each other may be disposed to be positioned in an inner region of the shielding sheet, and thus a magnetic field leaking into a gap between the two ferrite block bodies may be blocked by the shielding sheet.

For example, the shielding sheet may be a ribbon sheet including at least one type of an amorphous alloy and a nano-crystalline alloy.

Advantageous Effects

According to the present invention, a coil support member can serve to fix a receiving coil and serve as an auxiliary shielding material for shielding a magnetic field generated from the receiving coil, thereby increasing the efficiency of wireless power transfer. Accordingly, it is possible to implement a high Q value and increase reliability.

DESCRIPTION OF DRAWINGS

FIG. 4 is a cross-sectional view in a state in which FIG. 2 is coupled.

FIG. 7 is a cross-sectional view in a state in which FIG. 5 is coupled.

MODES OF THE INVENTION

Figure 1:
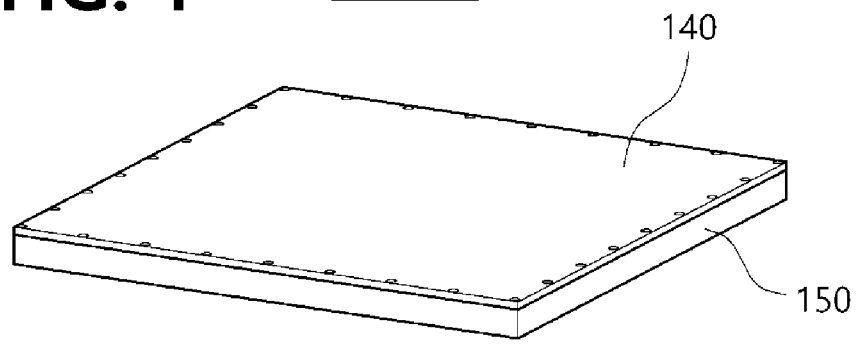
FIG. 1 is a view showing a wireless power receiving module for an electric vehicle according to the present invention.
Figure 2:
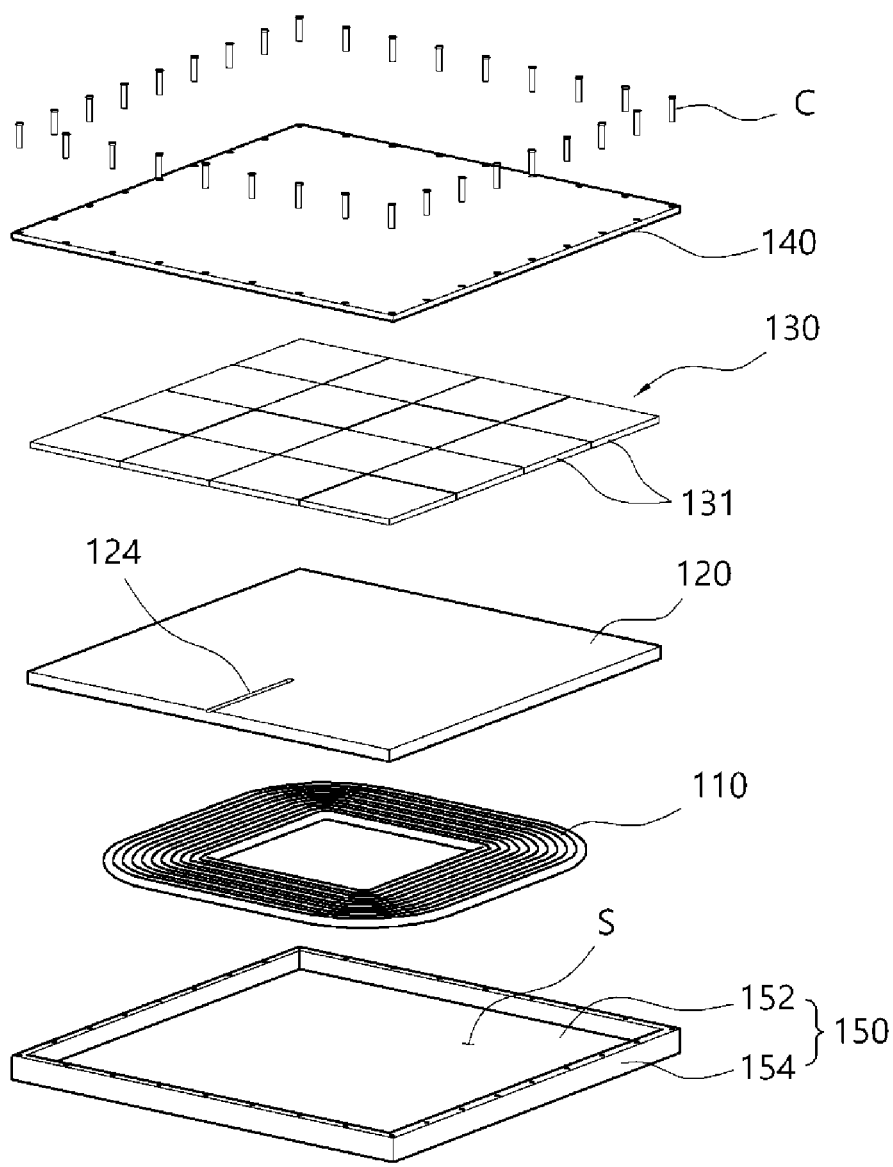
FIG. 2 is an exploded view showing the wireless power receiving module for an electric vehicle according to one embodiment of the present invention.

Hereinafter, embodiments of the present invention will be described in detail with reference to the accompanying drawings so that those skilled in the art to which the present invention pertains may easily carry out the present invention. The present invention may be implemented in various different forms and is not limited to the embodiments described herein. In order to clearly describe the present invention, parts irrelevant to the description are omitted from the drawings, and the same or similar elements are denoted by the same reference numerals throughout the specification.

Wireless power receiving devices 100 and 200 for an electric vehicle according to one embodiment of the present invention may be installed in an electric vehicle, and may receive wireless power transmitted from an external wireless power transmitting device to charge a battery of the electric vehicle.

Figure 9:
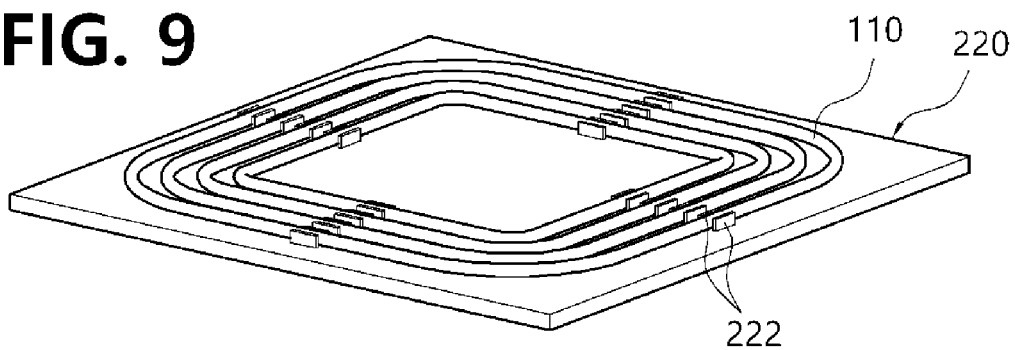
FIG. 9 is a view showing a state in which an antenna is fastened to another type of magnetic sheet applicable to the wireless power receiving module for an electric vehicle according to the present invention.

To this end, as shown in FIGS. 1 to 7, the wireless power receiving devices 100 and 200 for an electric vehicle according to one embodiment of the present invention may include a wireless power receiving coil 110, a coil support member 120, a ferrite core 130, and a metal plate 140, and the coil support member 120 may also be provided as a coil support member 220 in FIG. 9.

The wireless power receiving coil 110 may receive wireless power transmitted from an external wireless power transmitting device.

For example, the wireless power receiving coil 110 may be a plate-shaped coil in which a conductive member having a predetermined wire diameter is wound a plurality of times in one direction.

Here, the conductive member may be a Litz wire having a predetermined wire diameter, but is not limited thereto, and all known conductive materials used for a wireless power receiving coil may be used.

The wireless power receiving coil 110 may be fixed to one surface of each of the coil support members 120 and 220. Accordingly, the wireless power receiving coil 110 may maintain an initial installation position without moving even when the electric vehicle is shaken while driving.

That is, the coil support members 120 and 220 may fix the wireless power receiving coil 110 by forming a position fixing means at a position corresponding to the wireless power receiving coil 110.

Figure 3:
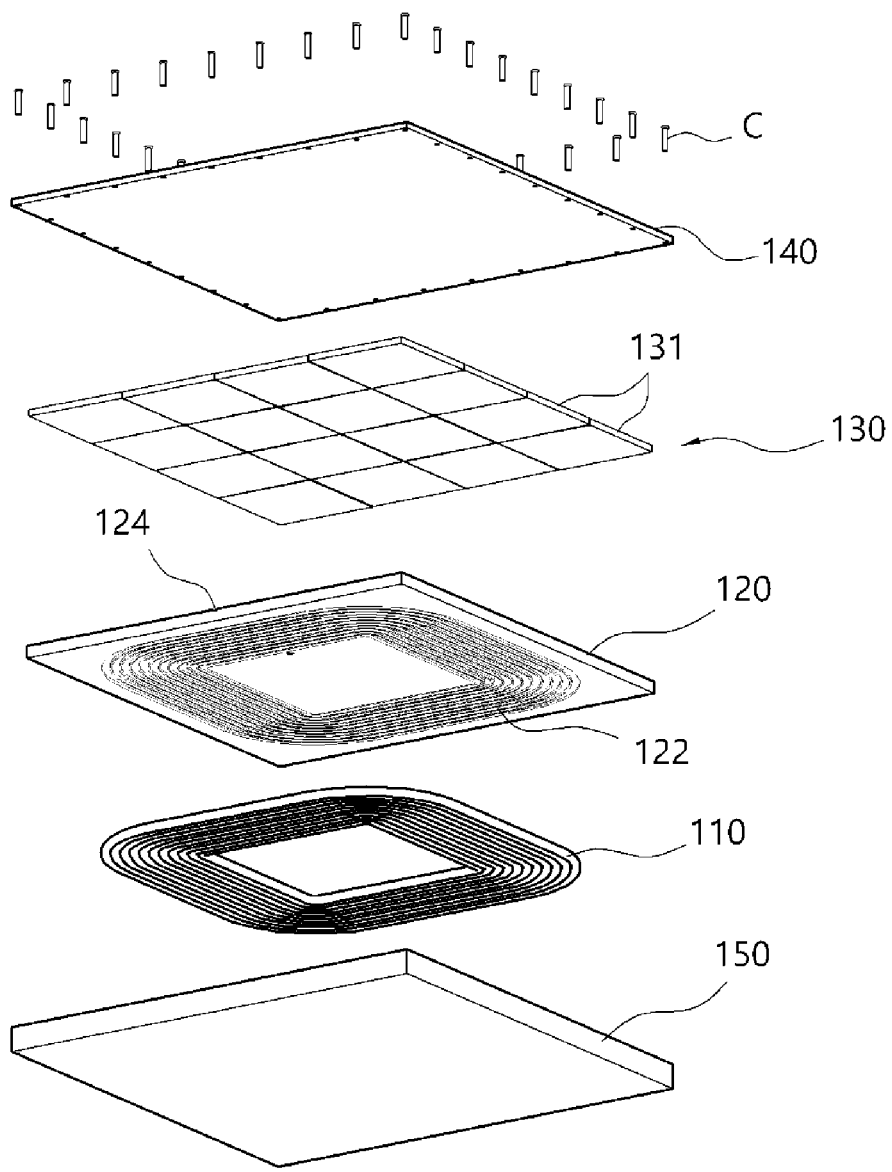
FIG. 3 is a view of FIG. 2 from another direction.
Figure 6:
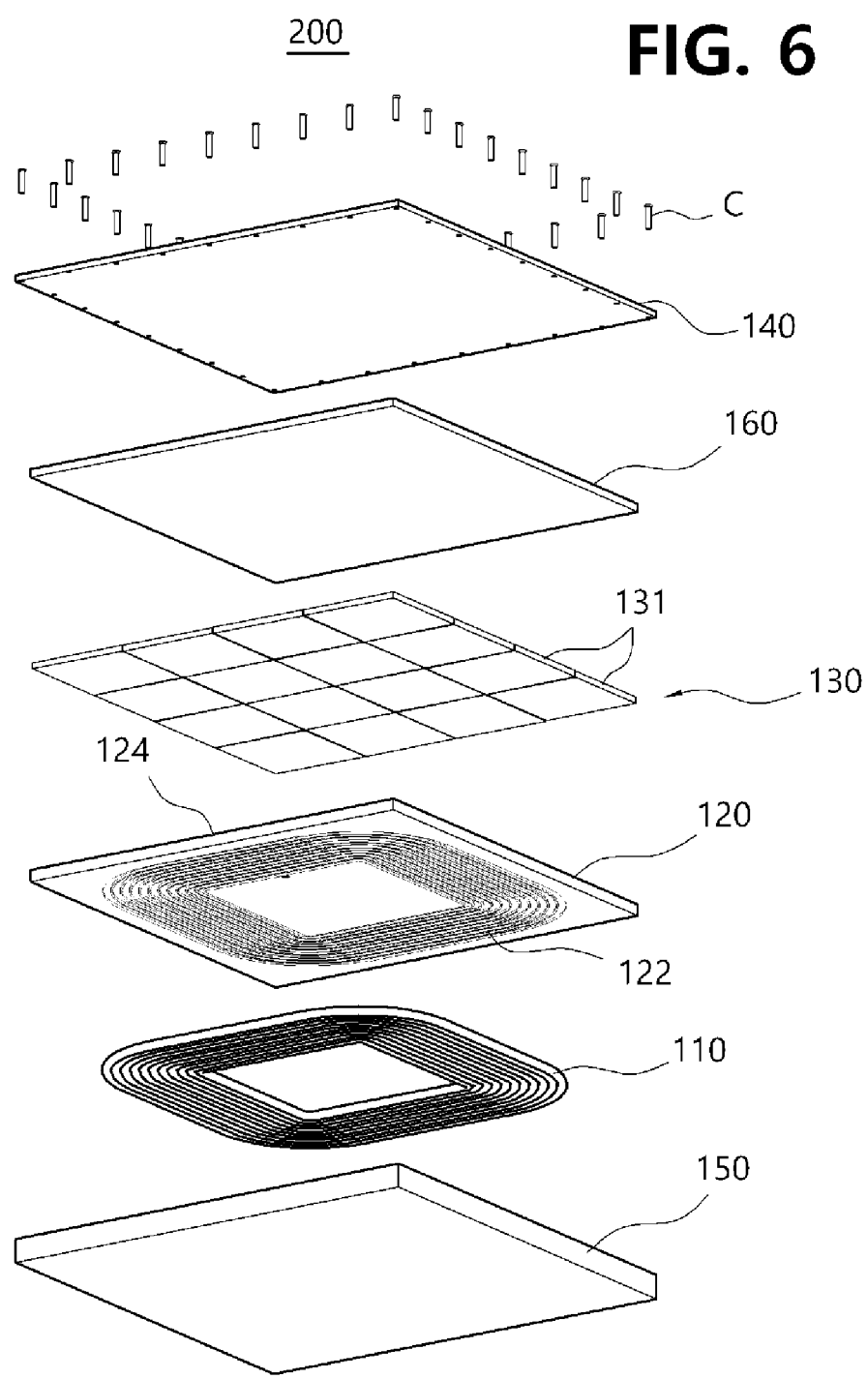
FIG. 6 is a view of FIG. 5 from another direction.

For example, as shown in FIGS. 3 and 6, the position fixing means may be an accommodating groove 122 that is formed by recessing one surface of the coil support member 120 in a shape corresponding to the wireless power receiving coil 110.

Figure 4:
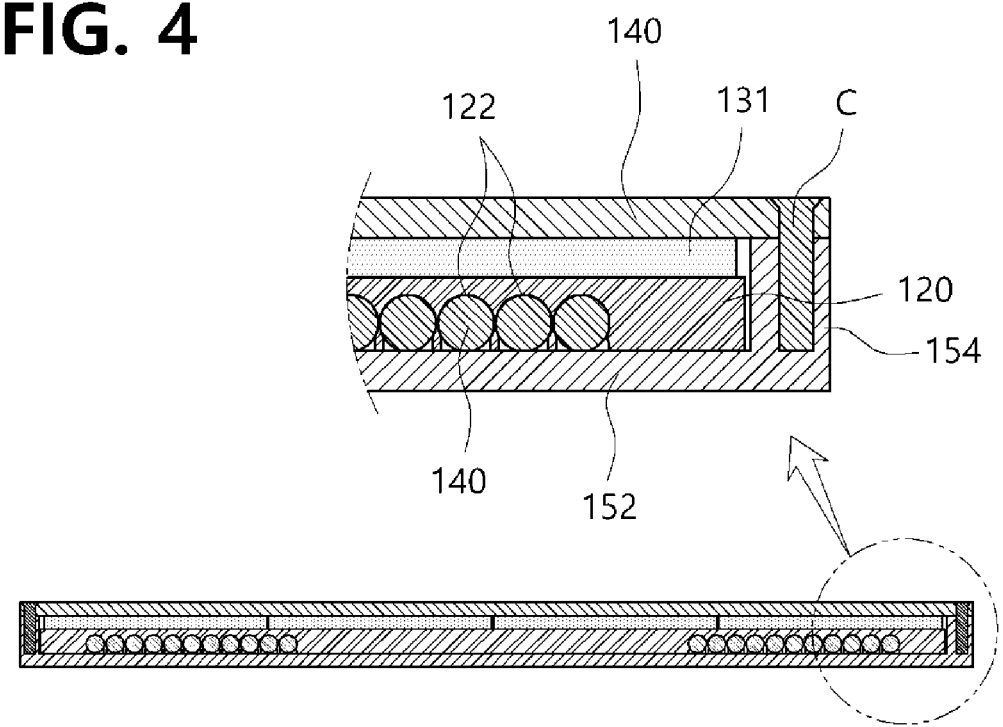
Figure 7:
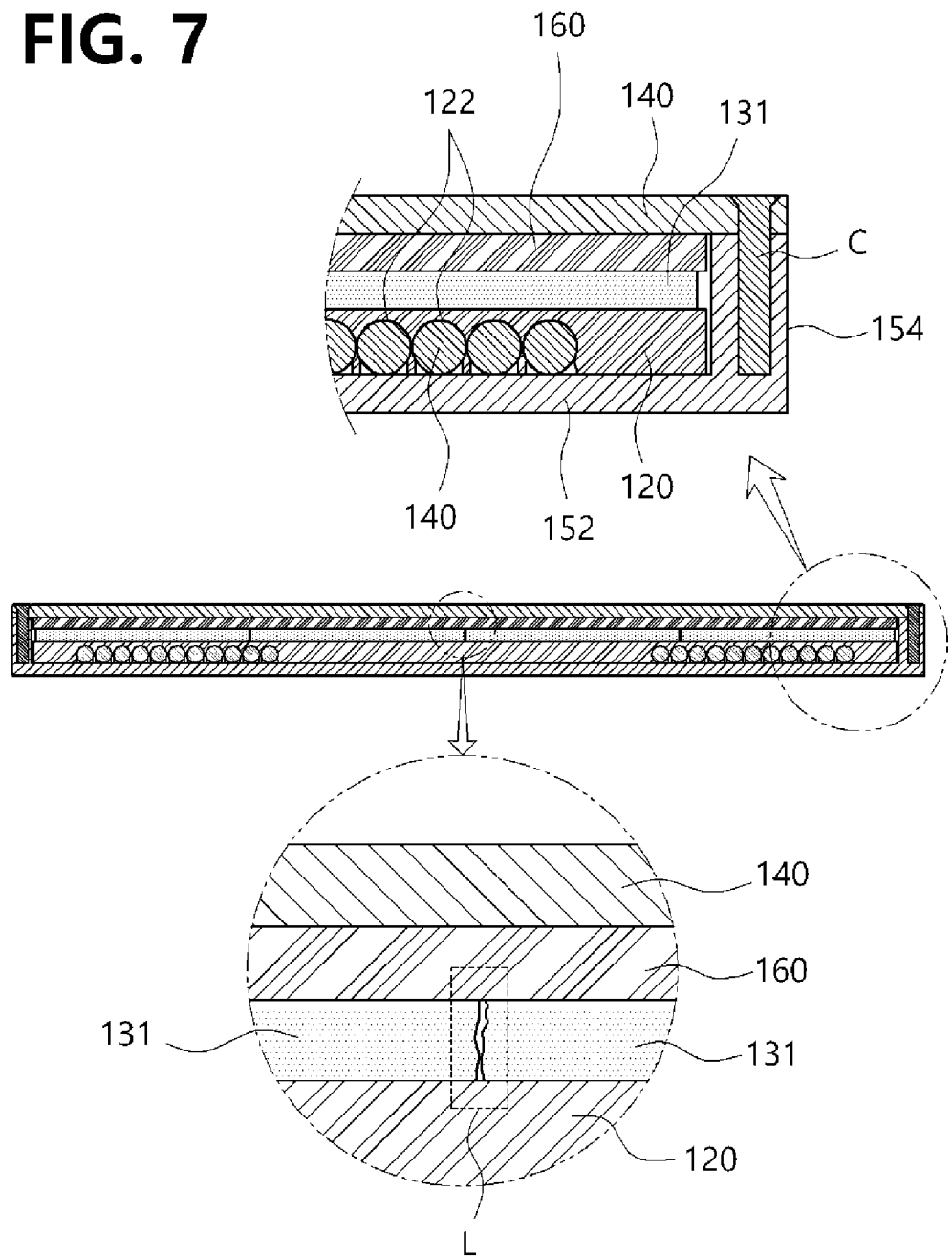

Accordingly, as shown in FIGS. 4 and 7, when the wireless power receiving coil 110 is inserted into the accommodating groove 122 of the coil support member 120, the wireless power receiving coil 110 may be prevented from being moved through the accommodating groove 122.

As another example, the position fixing means may be a pair of protrusions 222 formed to protrude from one surface of the coil support member 220 as shown in FIG. 9.

That is, the pair of protrusions 222 may be formed to protrude from one surface of the coil support member 220 at an interval so that the conductive member configuring the wireless power receiving coil 110 may be fitted therein.

Accordingly, as shown in FIG. 9, when the middle portion of a length of the conductive member configuring the wireless power receiving coil 110 is inserted into the pair of protrusions 222, the wireless power receiving coil 110 may be prevented from being moved through the pair of protrusions 222.

Here, the coil support members 120 and 220 may include a seating groove 124 configured to accommodate a portion of both ends of the wireless power receiving coil 110, which is drawn out from an inner hollow of a coil body to the outside.

In this case, the coil support members 120 and 220 may include a magnetic substance to fix the wireless power receiving coil 110 through the position fixing means and shield the magnetic field generated from the wireless power receiving coil 110.

That is, the coil support members 120 and 220 may include the magnetic substance to shield the magnetic field, thereby shielding the magnetic fields generated from the wireless power receiving coil 110 together with the ferrite core 130.

Accordingly, the coil support members 120 and 220 may serve as an auxiliary shielding material for shielding the magnetic field.

For example, the coil support members 120 and 220 may be formed of a composite in which a magnetic substance is dispersed in a polymer, and the composite may be formed through injection, extrusion, or compaction.

Here, the magnetic substance may include at least one type of an amorphous alloy, a nano-crystalline alloy, a ferrite, silicon steel, and permalloy, but is not limited thereto and may be used without limitation as long as it is a material capable of shielding the magnetic field.

In addition, in the polymer, a thermoplastic polymer compound may be used as a main resin, and the polymer may further include various additives such as a strength improver, an impact modifier, an antioxidant, a heat stabilizer, a light stabilizer, a plasticizer, a dispersant, a work improving agent, a coupling agent, a UV absorber, an antistatic agent, and a flame retardant in addition to the main resin, which is a thermoplastic polymer compound.

Accordingly, in the wireless power receiving devices 100 and 200 for an electric vehicle according to one embodiment of the present invention, the coil support members 120 and 220 may serve to fix the wireless power receiving coil 110 and serve as the auxiliary shielding material for shielding the magnetic field generated from the wireless power receiving coil 110, thereby increasing the efficiency of wireless power transfer. Accordingly, the wireless power receiving devices 100 and 200 for an electric vehicle according to one embodiment of the present invention may implement a high Q value to increase reliability, and reduce the amount of loss by the increased efficiency to reduce the amount of heat generated during operation.

In addition, the coil support members 120 and 220 may further include a heat dissipation filler to have a heat dissipation property as well as magnetic field shielding performance.

The ferrite core 130 may have a predetermined area and may be disposed on one surfaces of each of the coil support members 120 and 220.

The ferrite core 130 may serve as a main shielding material for shielding the magnetic field generated from the wireless power receiving coil 110.

In this case, the ferrite core 130 may be configured to implement the required shielding performance while minimizing an increase in production costs even when it is implemented to have a large area of 100 mm×100 mm or more.

To this end, the ferrite core 130 may be composed of a plurality of ferrite block bodies 131 having predetermined areas, and the plurality of ferrite block bodies 131 may have one sides disposed adjacent to each other.

In the present invention, the ferrite block body 131 may be formed in the form of being sintered through a sintering process after the ferrite powder is pressed. In this case, the ferrite block body 131 may be made of Ni—Zn ferrite or Mn—Zn ferrite, but made of Mn—Zn ferrite to exhibit relatively excellent performance in a frequency band of 100 to 350 kHz.

As described above, the ferrite block body 131 may have one sides disposed adjacent to each other to configure the ferrite core 130, thereby serving as the main shielding material for shielding the magnetic field.

Here, the plurality of ferrite block bodies 131 may be arranged in a matrix structure of m×n (m and n are natural numbers), and each ferrite block body 131 may have the same size or different sizes.

The metal plate 140 may have a predetermined area and may be disposed on one surface of the ferrite core 130. Accordingly, the metal plate 140 may cover the entire one surface of the ferrite core 130 composed of the plurality of ferrite block bodies 131.

For example, the metal plate 140 may be a metal plate having a predetermined area, and as a non-limiting example, the metal plate may be made of aluminum.

Accordingly, the metal plate 140 may shield the electromagnetic waves generated from the wireless power receiving coil 110, thereby preventing damage to or malfunction of other electronic components included in the electric vehicle.

In this case, the wireless power receiving devices 100 and 200 for an electric vehicle according to one embodiment of the present invention may further include a housing-shaped case 150 having an inner space S with an open one side, and the metal plate 140 may be coupled to the case 150 via a fastening member C.

That is, the case 150 may include a bottom portion 152 having a predetermined area and a sidewall portion 154 protruding from an edge of the bottom portion 152 to a predetermined height, and the inner space S may be formed in the form of an open one side through the bottom portion 152 and the sidewall portion 154.

In this case, an edge of the metal plate 140 may be fastened to the sidewall portion 154 via the fastening member C.

Accordingly, the wireless power receiving coil 110, the coil support members 120 and 220, and the ferrite core 130 may be accommodated in the inner space S, and the entire assembly may be completed by inserting the wireless power receiving coil 110, the coil support members 120 and 220, and the ferrite core 130 into the inner space S and then fastening the metal plate 140 to the sidewall portion 154 of the case 150.

Accordingly, in the wireless power receiving devices 100 and 200 for an electric vehicle according to one embodiment of the present invention, the entire assembly may be completed by sequentially inserting the coil support members 120 and 220 and the ferrite core 130 into the inner space S so that the wireless power receiving coil 110 faces the bottom portion 152 in a state in which the wireless power receiving coil 110 is fixed to one surfaces of the coil support members 120 and 220 and then fastening the metal plate 140 to the sidewall portion 154 of the case 150, thereby increasing assemblability and increasing productivity.

Here, the case 150 may be made of a material having a heat dissipation property. For example, the case 150 may be made of a plastic material having a heat dissipation property.

Accordingly, the wireless power receiving devices 100 and 200 for an electric vehicle according to one embodiment of the present invention may discharge heat generated when the wireless power receiving coil 110 is operated to the outside through the case 150, thereby further increasing wireless power transfer efficiency.

Figure 5:
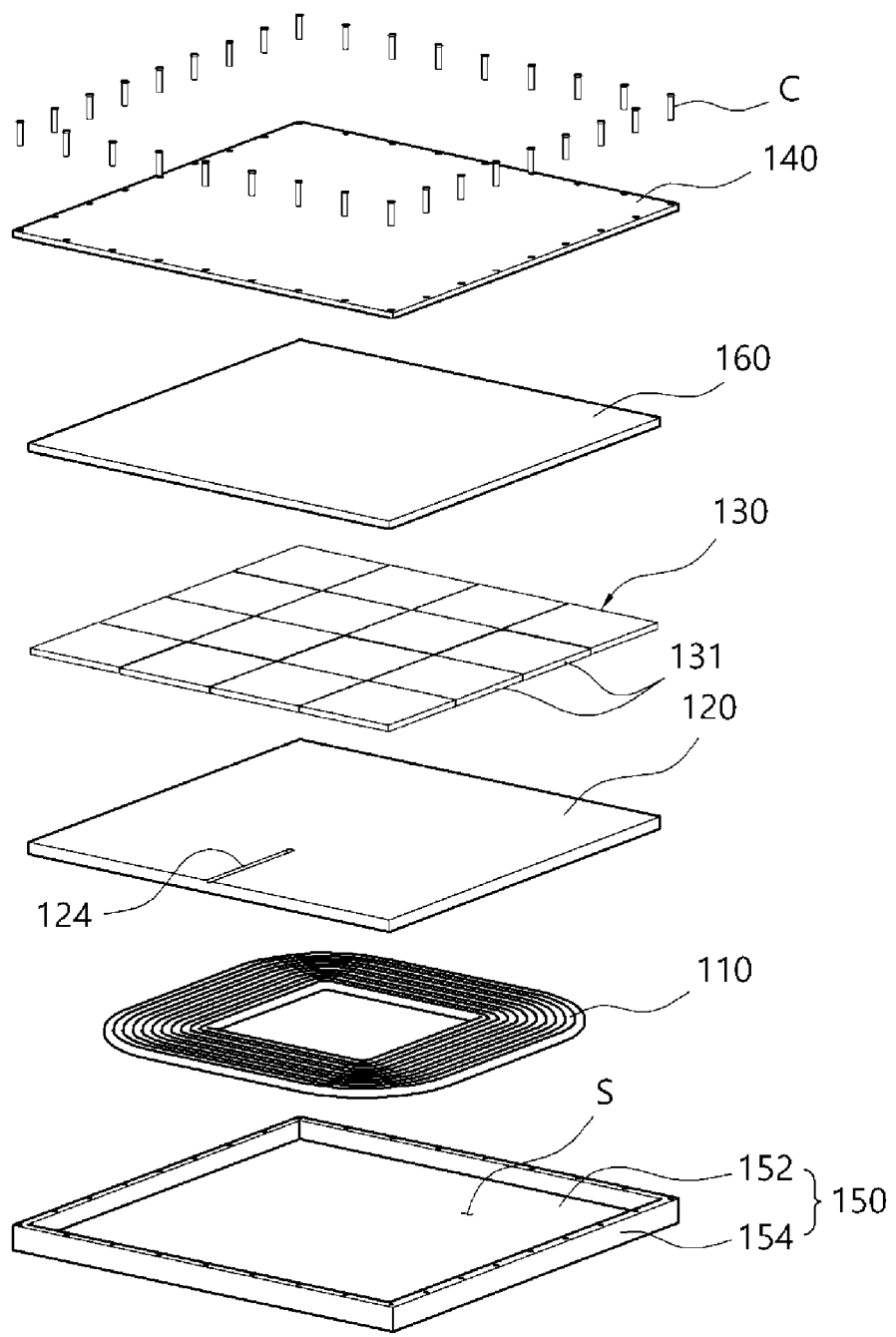
FIG. 5 is an exploded view showing a wireless power receiving module for an electric vehicle according to another embodiment of the present invention.

Meanwhile, the wireless power receiving device 200 for an electric vehicle according to one embodiment of the present invention may further include a shielding sheet 160 disposed between the ferrite core 130 and the metal plate 140 as shown in FIGS. 5 to 7.

In this case, as can be seen from the enlarged view of FIG. 7, a boundary region L between two ferrite block bodies 131 disposed adjacent to each other among the plurality of ferrite block bodies 131 configuring the ferrite core 130 may be disposed to be positioned in the inner region of the shielding sheet 160.

To this end, the shielding sheet 160 may be provided in a plate shape having a predetermined area, and provided to have a relatively larger size or a relatively larger area than that of the ferrite block body 131.

Preferably, the shielding sheet 160 may have an area equal to or larger than an area obtained by summing the areas of two ferrite block bodies 131 disposed adjacent to each other, or have the same area as the total area of the ferrite core 130.

Accordingly, the wireless power receiving device 200 for an electric vehicle according to one embodiment of the present invention may block a leaking magnetic field through the shielding sheet 160 even when the magnetic field leaks into a gap formed between two ferrite block bodies 131 disposed adjacent to each other in a process of shielding the magnetic field through the ferrite core 130.

Accordingly, the wireless power receiving device 200 for an electric vehicle according to one embodiment of the present invention may block a magnetic field leaking into the gap between the ferrite block bodies 131 through the shielding sheet 160, so that it is possible to reduce the amount of leakage of the magnetic field, thereby increasing shielding performance.

In addition, even when the plurality of ferrite block bodies 131 configuring the ferrite core 130 are disposed adjacent to other ferrite block bodies 131 in a state where a surface is not flat and includes a fine protrusion protruding from the surface, the magnetic field leaking into the gap between two ferrite block bodies 131 adjacent to each other may be induced to the shielding sheet 160, thereby preventing the magnetic field from being concentrated on the protrusion side.

Accordingly, the wireless power receiving device 200 for an electric vehicle according to one embodiment of the present invention may induce the magnetic field leaking into the gap between the ferrite block bodies 131 to the shielding sheet 160 to block the magnetic field from being concentrated on the protrusion side, thereby solving a heat-generating problem such as a hot spot due to magnetic field concentration.

Here, although the shielding sheet 160 is shown and described as being disposed between the ferrite core 130 and the metal plate 140, the present invention is not limited thereto, and the shielding sheet 160 may also be disposed between the ferrite core 130 and the coil support member 120, and may also be disposed between the ferrite core 130 and the metal plate 140 and between the ferrite core 130 and the coil support member 120.

Meanwhile, the shielding sheet 160 may be formed of a magnetic sheet to shield the magnetic field leaking from the ferrite core 130 as described above.

For example, the shielding sheet 160 may be a ribbon sheet including at least one type of an amorphous alloy and a nano-crystalline alloy, and the ribbon sheet may be a sheet separately formed into a plurality of pieces through flake treatment. In addition, the shielding sheet 160 may be a multi-layer sheet in which a plurality of ribbon sheets are stacked in multiple layers via an adhesive layer. In this case, the shielding sheet 160 may include a protective film 166 attached to upper and lower surfaces via an adhesive layer 164 to prevent the pieces from being separated.

Figure 8:
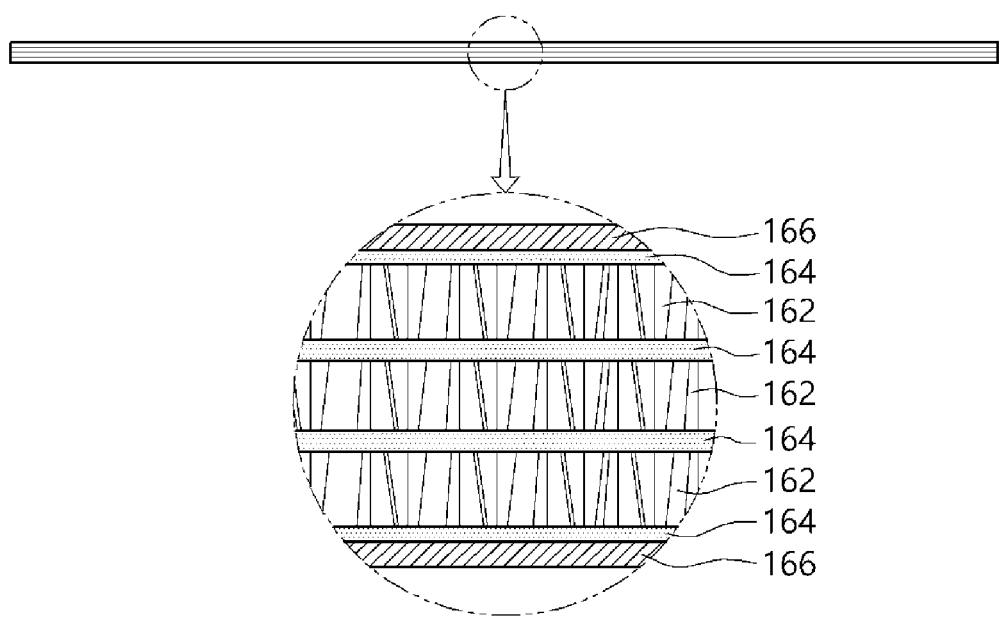
FIG. 8 is a cross-sectional view showing a shielding sheet applicable to FIG. 5.

That is, as shown in FIG. 8, in the shielding sheet 160, the ribbon sheet 162 may be separately formed into the plurality of pieces through flake treatment, and each piece may be formed in an atypical form. Accordingly, the shielding sheet 160 may increase overall resistance to suppress the generation of an eddy current, thereby reducing the loss due to the eddy current.

In addition, the shielding sheet 160 may be a multi-layer sheet in which the plurality of ribbon sheets 162 separated into the plurality of pieces through flake treatment are stacked in multiple layers. In this case, the adhesive layer 164 including a non-conductive component may be disposed between the ribbon sheets 162.

The adhesive layer 164 may also serve to insulate adjacent pieces by partially or entirely permeating into each of the ribbon sheets 162 stacked to move between the pieces configuring the ribbon sheet 162. Here, the adhesive layer may also be provided as an adhesive or may also be provided in the form in which the adhesive is applied to one surface or both surfaces of a film-type substrate.

However, the material of the shielding sheet 160 is not limited thereto, and may be used without limitation as long as it is a material capable of shielding the magnetic field such as a composite in which a magnetic substance is dispersed in a polymer or ferrite.

While one embodiment of the present invention has been described above, the spirit of the present invention is not limited to the embodiment presented in this specification, and those skilled in art who understand the spirit of the present invention may easily propose other embodiments by adding, changing, or deleting components within the scope of the same spirit, and these are also included in the spirit scope of the present invention.

The invention claimed is:

1. A wireless power receiving device for an electric vehicle, the wireless power receiving device comprising:
   a wireless power receiving coil configured to receive wireless power transmitted from the outside;
   a coil support member configured to prevent movement of the wireless power receiving coil by fixing the wireless power receiving coil through a position fixing means formed at a position corresponding to the wireless power receiving coil;
   a ferrite core including a plurality of ferrite block bodies having predetermined areas and disposed on one surface of the coil support member to be adjacent to each other; and
   a plate-shaped metal plate provided with a predetermined area, disposed to cover one surface of the ferrite core, and provided as a metal plate to shield an electromagnetic wave,
   wherein the ferrite core serves as a main shielding material to shield the magnetic field generated from the wireless power receiving coil, and
   wherein the coil support member is a composite in which the magnetic substance is dispersed in a polymer so as to serve as an auxiliary shielding material that assists the ferrite core and shields a magnetic field.

2. The wireless power receiving device of claim 1, wherein the position fixing means is an accommodating groove formed by recessing the one surface of the coil support member.

3. The wireless power receiving device of claim 1, wherein the position fixing means is a pair of protrusions formed to protrude from the one surface of the coil support member at an interval so that a conductive member configuring the wireless power receiving coil is fitted therein.

4. The wireless power receiving device of claim 1, wherein the magnetic substance includes at least one type of an amorphous alloy, a nano-crystalline alloy, a ferrite, silicon steel, and permalloy.

5. The wireless power receiving device of claim 1, further comprising a housing-shaped case having an inner space with an open one side to accommodate the wireless power receiving coil, the coil support member, and the ferrite core,
   wherein the case includes a bottom portion having a predetermined area, and a sidewall portion protruding from an edge of the bottom portion to a predetermined height to form the inner space, and
   an edge of the metal plate is coupled to the sidewall portion via a fastening member to cover the open one side of the inner space.

6. The wireless power receiving device of claim 5, wherein the case is made of a plastic material having a heat dissipation property.

7. The wireless power receiving device of claim 1, further comprising a plate-shaped shielding sheet disposed between the ferrite core and the metal plate.

8. The wireless power receiving device of claim 7, wherein a boundary region between two ferrite block bodies disposed adjacent to each other is disposed to be positioned in an inner region of the shielding sheet, and thus a magnetic field leaking into a gap between the two ferrite block bodies is blocked by the shielding sheet.

9. The wireless power receiving device of claim 7, wherein the shielding sheet is a ribbon sheet including at least one type of an amorphous alloy and a nano-crystalline alloy.

* * * * *